US009227252B2

United States Patent
Horiguchi

(10) Patent No.: US 9,227,252 B2
(45) Date of Patent: Jan. 5, 2016

(54) ELBOW FORMED BY CUTTING AND METHOD FOR MANUFACTURING SAME

(75) Inventor: Nobuo Horiguchi, Osaka (JP)

(73) Assignees: Noda Kanagata Co., Ltd., Osaka (JP); Keiko Horiguchi, Osaka (JP)

( * ) Notice: Subject to any disclaimer, the term of this patent is extended or adjusted under 35 U.S.C. 154(b) by 117 days.

(21) Appl. No.: 13/807,282

(22) PCT Filed: Jun. 28, 2010

(86) PCT No.: PCT/JP2010/060985
§ 371 (c)(1),
(2), (4) Date: Dec. 27, 2012

(87) PCT Pub. No.: WO2012/001761
PCT Pub. Date: Jan. 5, 2012

(65) Prior Publication Data
US 2013/0099477 A1      Apr. 25, 2013

(51) Int. Cl.
*B23C 3/00*      (2006.01)
*B23C 3/16*      (2006.01)
*B23C 5/08*      (2006.01)
(Continued)

(52) U.S. Cl.
CPC ... *B23C 3/16* (2013.01); *B23C 5/08* (2013.01); *B23C 5/109* (2013.01); *F16L 43/001* (2013.01); *B23C 2220/04* (2013.01); *B23C 2220/52* (2013.01); *B23C 2222/84* (2013.01); *B23C 2222/88* (2013.01); *B23C 2265/40* (2013.01); *Y10T 409/303808* (2015.01)

(58) Field of Classification Search
CPC ............ B23C 3/16; B23C 5/109; B23C 5/08; B23C 5/14; B23C 2222/84; B23C 2265/40; B23C 2222/88; B23C 2220/04; F16L 43/001; Y10T 409/303808
See application file for complete search history.

(56) References Cited

U.S. PATENT DOCUMENTS

| 6,450,001 | B1 | 9/2002 | Kimura | |
|---|---|---|---|---|
| 6,485,236 | B1 * | 11/2002 | Engeli et al. | 409/132 |
| 2004/0093727 | A1 | 5/2004 | Mola | |

FOREIGN PATENT DOCUMENTS

| CN | 101625060 A | 1/2010 |
|---|---|---|
| DE | 3603582 C | 3/1987 |
| DE | 19502342 A | 8/1995 |

(Continued)

OTHER PUBLICATIONS

Partial Translation of Notice of Rejection for Japanese Patent Application No. 2009-124104 dated Sep. 29, 2009.

(Continued)

*Primary Examiner* — Alexander P Taousakis
(74) *Attorney, Agent, or Firm* — Procopio, Cory, Hargreaves & Savitch LLP

(57) ABSTRACT

A hole is formed in an elbow through the steps of: forming a starting hole in a material, the starting hole having an undercut remaining on a hole surface; finishing an inner diameter of the starting hole ($11_{-3}$) on one end side by revolving a side cutter (II) including an arc-shaped cutting edge and having an outer diameter smaller than a finishing hole diameter while rotating the side cutter (II) in such a posture that the side cutter (II) is inclined in a predetermined direction relative to the material (12), the revolving being carried out so that the side cutter moves along a hole surface to be finished; and finishing the inner diameter of the starting hole ($11_{-3}$) on another end side by revolving the side cutter (II) while rotating the side cutter (II).

6 Claims, 16 Drawing Sheets

(51) Int. Cl.
*B23C 5/10* (2006.01)
*F16L 43/00* (2006.01)

(56) References Cited

FOREIGN PATENT DOCUMENTS

| JP | 51-33390 A | 3/1976 |
|---|---|---|
| JP | 61-027570 U | 2/1986 |
| JP | 62-271616 A | 11/1987 |
| JP | 62271616 A | 11/1987 |
| JP | H01-289611 A | 11/1989 |
| JP | 02-047595 A | 2/1990 |
| JP | H03-117558 U | 12/1991 |
| JP | 07-041315 A | 2/1995 |
| JP | 2000-343136 A | 12/2000 |
| JP | 2001-073802 A | 3/2001 |
| JP | 2008-223454 A | 9/2008 |
| JP | 2010-269416 A | 12/2010 |

OTHER PUBLICATIONS

International Search Report dated Sep. 14, 2010 in PCT/JP2010-060985.
Japanese Patent Application No. 2012-522367 of Office Action mailed on Feb. 5, 2014.
Ukrainian Patent Application No. a201300732 of Office Action mailed on Feb. 21, 2014.
Russian Patent Application No. 2013102620: Office Action mailed on Apr. 7, 2014.
Written Opinion of the International Searching Authority (PCT/ISA/237, mailing date Sep. 14, 2010) of International Preliminary Report on Patentability dated Feb. 12, 2013, in PCT/JP2010/060985.
Chinese Patent Application No, 201080067832.5: Office Action mailed Sep. 2, 2014.
Extended European Search Report No. 10854058.4-1709/2586551 mailed Jun. 19, 2015.

\* cited by examiner

OUTER SIDE

INNER SIDE

ELBOW FORMED BY CUTTING AND METHOD FOR MANUFACTURING SAME

TECHNICAL FIELD

The present invention relates to an elbow formed by cutting (bent pipe) for a pipe and a method of manufacturing the same.

BACKGROUND ART

As examples of metallic elbows for a pipe, there are known a casted elbow formed with a die, an elbow formed by bending a straight pipe, a welded elbow formed by integrally but-welding two halved bent pipe materials obtained by pressing a metal plate, and a machined elbow formed by cutting a metal material.

Of those, the machined elbow is given in, for example, Patent Literature 2 below. Further, Patent Literature 1 below describes the elbow formed by bending and the welded elbow.

CITATION LIST

Patent Literature

[PTL 1] JP 7-41315 B
[PTL 2] JP 2000-343136 A (JP 3352052 B2)

SUMMARY OF INVENTION

Technical Problem

In the conventional machined elbow, an internal flow path is formed by forming holes in a material from two directions, and then intersecting the two holes inside. Therefore, for example, regarding a 90° elbow, the internal flow path forms substantially a right angle, and hence there is a disadvantage in that the flow path resistance becomes larger when the elbow is used as a part of a pipe. This disadvantage is pointed out in paragraph 0009 of Patent Literature 2.

The problem of the flow path resistance can be solved by forming a gently-bent hole. However, it has been considered that it is impossible to form a machined elbow having a hole of such a shape, in particular, an elbow having a bent angle of 90° or more and employing, as a material, a low machinability material such as stainless steel (SUS), a titanium-based material, a nickel-based heat-resistant alloy (an alloy that is nickel-based and added with an alloy element such as iron, chromium, niobium, and molybdenum: for example, product name: Inconel, produced by Special Metals Corporation), even with use of 5-axis machines and multi-axis machines using the latest technologies.

With use of a processing machine having the latest functions, a bent hole can be processed to a certain degree. However, in a general processing method, an undercut (machining remainder part) that cannot be processed is formed on the hole surface in a part which corresponds to the inner side of the bend, and this part deteriorates the fluid flow. Thus, a product is not suitable for practical use. Therefore, as an elbow of this field, there has been employed an elbow manufactured by any one of casting, bending, and welding.

However, in the casted elbow, a defect such as a blow hole is easily generated, and it is difficult to secure reliability in terms of quality. In addition, the casted elbow has a lower rigidity than other elbows.

Further, in the elbow formed by bending, the wall thickness and strength in respective parts are not uniform. The wall thickness and strength of the tube tend to reduce on the outer side of the bend, which rather requires larger wall thickness and strength than the inner side of the bend. Thus, the sectional shape of the pipe cannot be formed with high accuracy.

Further, in the welded elbow, a material texture at the welding joint part may change to the one which easily causes a stress corrosion crack, and a large strain is unavoidable as well due to welding.

For example, a pipe for airplane engines and a pipe for nuclear related facilities are required to clear very strict conditions. In such applications, there has been long-awaited an elbow having high quality, high accuracy, and low flow path resistance.

The machined elbow is a product obtained by integrally processing an ingot metal. The machined elbow is generated without cavities, welding defects, and strains, and hence has excellent reliability in terms of quality. With use of a highly accurate processing machine, it is also possible to improve the dimension accuracy and the shape accuracy. If the hole of the machined elbow can be satisfactorily processed, a problem of the flow path resistance, which is the weak point of the machined elbow, is eliminated, and it is possible to realize a metallic elbow which satisfies the demands of high quality, high accuracy, and low flow path resistance.

In view of this, one or more embodiments of the present invention has an object to enable manufacturing of an elbow by machining so that the elbow has no unnecessary thickness inside, has a circular shape in a cross-section perpendicular to its axis in each axial part, and has a hole including a hole surface that is gently bent along an center axis. Further, one or more embodiments of the present invention has an object to provide an elbow that can be obtained by the above-mentioned method.

Solution to Problem

In order to solve the above-mentioned problem, the present invention provides a method of manufacturing an elbow by machining, comprising forming a hole in a material to be formed into the elbow, said forming of the hole comprising forming a starting hole in the material by rough cutting of the material from two directions with a rotary cutting tool, the starting hole having an undercut remaining at least on a hole surface on a side which corresponds to an inner side of a bend of the elbow as a finished product, finishing a radially inner surface of the starting hole on one end side using a side cutter including an arc-shaped cutting edge at an outer periphery thereof and having an outer diameter smaller than a finished hole diameter, wherein the side cutter is inclined at a predetermined angle (θ4) relative to the material such that an end surface of the side cutter is more remote from an opening of the starting hole on the inner side of the bend of the elbow to be cut, and is cut into the surface of the starting hole, while simultaneously revolving the side cutter and rotating the side cutter about a center axis of the side cutter, such that the hole has a completely circular cross section taken along a plane perpendicular a center axis of the hole and perpendicular the center axis of the side cutter, and an oval cross-section taken along any plane perpendicular to the center axis of the hole and not perpendicular to the center axis of the side cutter, whereby the side cutter moves along the surface of the hole, and finishing the radially inner surface of the starting hole on another end side by inserting the side cutter into the starting hole from the another end side of the starting hole, and revolving the side cutter along the hole surface to be finished while rotating the side cutter.

When the starting hole is subjected to finishing, the side cutter is revolved along a trajectory of a shape similar to a cut end shape of the hole in each axial part when the hole to be finished is cut perpendicularly to the center axis of the side cutter (the cut end shape becomes a true circle at a position at which the cross-section perpendicular to the axis of the hole of the elbow is parallel to a plane orthogonal to the center axis of the cutter, and becomes an ellipse at other positions). A main shaft of the processing machine is moved in accordance with a preset control program to enable this revolution.

When the machining allowance of the side cutter is large, the processing is performed several times.

Regarding the relative inclination angle between the material and the side cutter in the finishing of the starting hole, for example, when a relative inclination angle of about 25° is secured, the undercut remaining in the starting hole can be completely removed.

Further, in this method, it is preferred that processing of the starting hole be carried out using a milling cutter including an arc-shaped cutting edge at a leading end outer periphery thereof and having an outer diameter smaller than an inner diameter of the starting hole, the processing of the starting hole being carried out through the steps of: forming a through hole by causing the milling cutter to cut into each of adjacent two surfaces of the material while changing a cutting position and a cutting depth, the through hole having the undercut intersecting at an angle equal or nearly equal to a bent angle of the elbow on the inner side of the bend of the elbow, the through hole being shaped substantially along the hole surface of the hole of the elbow on an outer side of the bend of the elbow; and reducing a remaining amount of the undercut by inclining the milling cutter in a direction in which a leading end of the milling cutter comes near the inner side of the bend of the elbow to cut off the undercut, the cutting off the undercut being repeated several times while changing a inclination angle of the milling cutter.

The outer diameter processing of the elbow in this method can be performed by a method of sequentially performing roughing by a face milling cutter and the like and finishing by a ball end mill and the like. This outer diameter processing is preferred to be performed after the hole is formed, but can be performed before the hole is formed.

Note that, one or more embodiments of the present invention is particularly effective to be applied to manufacturing of a special elbow having a bent angle of 90° or more, which has particular difficulty in processing, but can be applied to manufacturing of an elbow having a bent angle of 90° or less.

Further, one or more embodiments of the present invention is expected to have a particularly significant effect in a case where the material for the machined elbow is a metal, in particular, a low machinability material such as SUS as described above, but one or more embodiments of the present invention exerts its effectiveness even when a general metal such as iron or a resin is used as the material. For example, when an occasion arises where a small number of large-diameter special resin elbows need to be produced, the die cost is high if molding is performed. In such an occasion, it is economically effective to machine a resin material block to obtain an elbow having a required shape and size.

Moreover, in one or more embodiments of the present invention, an integrated elbow is formed by machining the material, and hence the hole of the elbow can be eccentrically located in an arbitrary direction with respect to the outer diameter of the elbow by design, or flanges for connection can be formed integrally at end portions of the tube.

In the manufacturing method of one or more embodiments of the present invention, until the relative inclination angle between the side cutter and the material reaches the allowance upper limit, processing is performed while inclining the side cutter and the material relative to each other in accordance with the hole bent state at the position at which the hole of the elbow is bent. Then, from the position at which the relative inclination angle between the side cutter and the material reaches the allowance upper limit, the relative inclination angle is fixed. With the above-mentioned method, the inner diameter on the one end side can be finished.

Further, the side cutter and the milling cutter can be inclined relative to the material by any one of a method of moving the material under a state in which the cutter is fixed, and a method of moving the cutter with respect to the material.

For example, the material may be inclined relative to the milling cutter and the side cutter in a necessary direction by employing a method of setting the material on a rotary table having a rotation indexing function under a state in which a center of the hole of the elbow to be machined is placed on a plane parallel to a table surface of the rotary table, and rotating the rotary table.

According to another aspect of the present invention, the elbow includes a hole having an center axis bent smoothly at a predetermined curvature. In this elbow, the hole has no machining remainder part inside and is a true circle. Further, the hole has a hole surface provided in parallel to the center axis of the elbow. In this case, the wall thickness may be uniform around the tube, or a center of the hole of the elbow may be eccentrically located with respect to a center of an outer diameter of the elbow so that the tube wall thickness on the outer side of the bend is larger than the tube wall thickness on the inner side of the bend.

It is preferred that the outer side of the bend be located at a position separated by 180° from a position of the inner side of the bend.

Further, it is preferred that the tube wall thickness be gradually increased from the inner side toward the outer side of the bend.

The tube wall thickness on the outer side of the bend may be larger than the tube wall thickness on the inner side of the bend, and may be more than twice the tube wall thickness on the inner side of the bend.

Further, the elbow may include a straight part on at least one end side of the elbow, and the elbow may include flanges formed integrally at both end portions of the elbow.

Advantageous Effects of Invention

The method according to one or more embodiments of the present invention has the following features. That is, the starting hole formed by roughing the material is subjected to finishing with use of a side cutter including an arc-shaped cutting edge and having an outer diameter smaller than a finishing hole diameter. In addition, at this time, the side cutter is revolved and moved on a spiral trajectory while being rotated in a posture inclined relative to the material in a direction in which the end surface of the cutter is separated from the opening of the starting hole on the inner side of the bend of the elbow.

The starting hole processing of the material can be performed by a known method, but in the conventional processing method, there is generated an undercut that cannot be processed on the hole surface on the inner side of the bend of the elbow. The undercut is cut off with use of a side cutter including an arc-shaped cutting edge.

A hole of a true circle can be formed relatively easily by the following method. That is, in order that the side cutter is revolved in a plane substantially perpendicular to the center axis of the hole of the elbow, while inclining the side cutter and the material relative to each other in accordance with the hole bent state at the position at which the hole of the elbow is bent, the side cutter is fed to finish the inner diameter of the hole of the elbow. However, for example, when a 90° elbow is to be manufactured by this method, it is necessary to incline the side cutter and the material relative to each other by 45° at maximum. In this state, interference between those members is unavoidable.

In one or more embodiments of the present invention, in order to avoid this problem, the relative inclination angle between the side cutter and the material is set to a small value (an angle in which interference between those members does not occur even when the starting hole is processed halfway in the axial direction). This angle changes depending on the diameter difference between the inner diameter of the hole of the elbow and an outer diameter of an arbor holding the side cutter. It is impossible to secure an inclination angle of 45° in the manufacturing of the 90° elbow, and hence the inclination angle is set to about 25°, for example.

Now, supposing that the side cutter is inclined at 25° relative to the material, when the hole to be finished of the elbow is cut at each axial part along a plane parallel to the end surface of the inclined side cutter, which is perpendicular to its axis, the cut end of the hole becomes an ellipse at most positions. The shape and size of the ellipse differ in each part of the cutting point, but by moving the cutter along the cut end shape at each part of the cutting point, the undercut remaining on the starting hole is perfectly removed, the hole of the elbow becomes a true circle in each axial part in a cross-section perpendicular to the axis, and further, the hole surface is finished to have a shape gently bent in parallel to the center axis.

Note that, in order to enable hole finishing by the method according to one or more embodiments of the present invention, there is used a side cutter having an outer diameter smaller than the diameter of the hole of the elbow. Further, as the diameter difference between the finishing diameter of the hole of the elbow and the outer diameter of the arbor supporting the side cutter (the arbor naturally has a diameter smaller than that of the side cutter) becomes larger, the allowance angle of the relative inclination between the side cutter and the material becomes larger, and thus the processable range from the one end side of the hole expands. However, when the outer diameter of the arbor becomes too small, the tool rigidity reduces, and thus chattering of the cutter is liable to occur during processing. This adversely affects the processing stability and processing accuracy, and hence the outer diameter of the arbor is set considering this point.

Further, the entire region of the hole of the elbow cannot be finished by the processing of the starting hole from the one end side, and hence the starting hole is processed also from the other end side to finish the starting hole.

As described above, according to one or more embodiments of the present invention, a side cutter including an arc-shaped edge is used to perform finishing of the starting hole while revolving the side cutter on the ellipse trajectory. In this manner, it is possible to manufacture a machined elbow having a circular cross-section and a gently-bent hole, which has been previously thought to be impossible.

Note that, the inventor of the present invention has proved this point by passing, through a 90° elbow, a ball smaller by 0.2% than the diameter of the elbow without clogging. Note that, actually, the inner diameter dimension is 50.9 mm, the ball diameter is 50.8 mm, and the material of the ball is zircon.

Further, machining is employed, and hence it is possible to manufacture an elbow in which the hole of the elbow is eccentrically located with respect to the outer diameter of the elbow to increase the tube wall thickness and strength on the outer side of the bend, an elbow including a straight part on at least one end thereof, and an elbow in which flanges for connection are integrally formed at both ends.

DESCRIPTION OF EMBODIMENTS

Now with reference to the attached drawings, description is made of a method of manufacturing an elbow by cutting, embodying the present invention, and an elbow manufactured by this method.

Figure 11A:
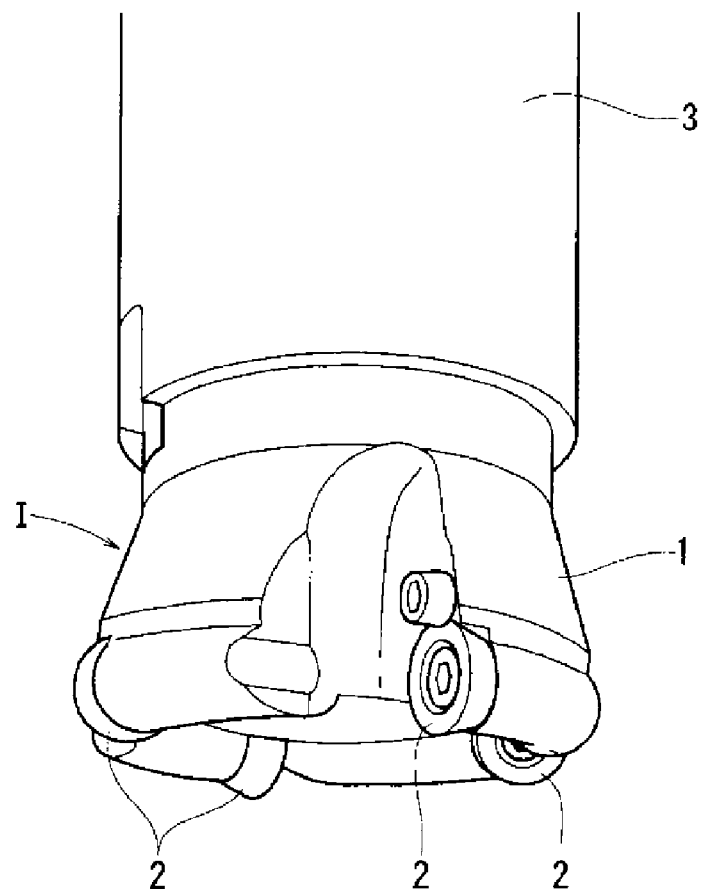
FIG. 11A A perspective view illustrating an example of a rotary cutting tool for use in roughing of a hole and an outer diameter in the method according to the present invention, under a state in which the rotary cutting tool is mounted on an arbor.

First, examples of rotary cutting tools used in the method according the present invention are illustrated in FIGS. 11A to 13. The cutting tool illustrated in FIGS. 11A and 11B is a commercially-available indexable milling cutter (face milling cutter) I including a plurality of arc-shaped cutting edges 2 circumferentially arranged at intervals around the leading end of the cutter body 1. The milling cutter I is used to form a starting hole in a material to be formed into the elbow and to roughly cut the radially outer surface of elbow. To perform such rough cutting with high efficiency, the milling cutter I shown, in which the cutting edges 2 are formed by removable round inserts, are preferably mounted on an arbor 3. But a milling cutter other than the face milling cutter shown, such as a radius end mill or a ball end mill, may be used instead.

Figure 12A:
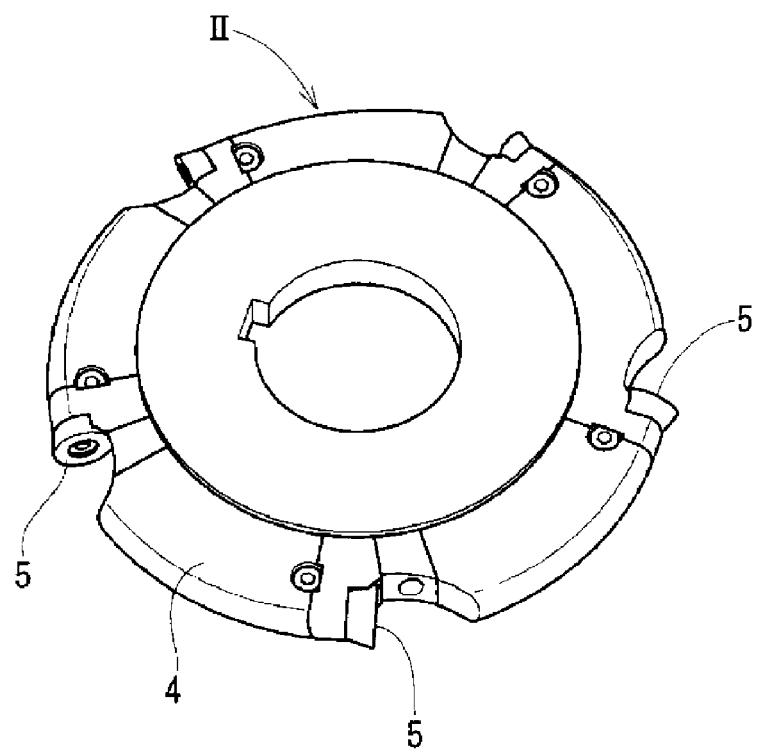
FIG. 12A A perspective view illustrating an example of a side cutter for use in finishing of the hole in the method according to the present invention.
Figure 12B:
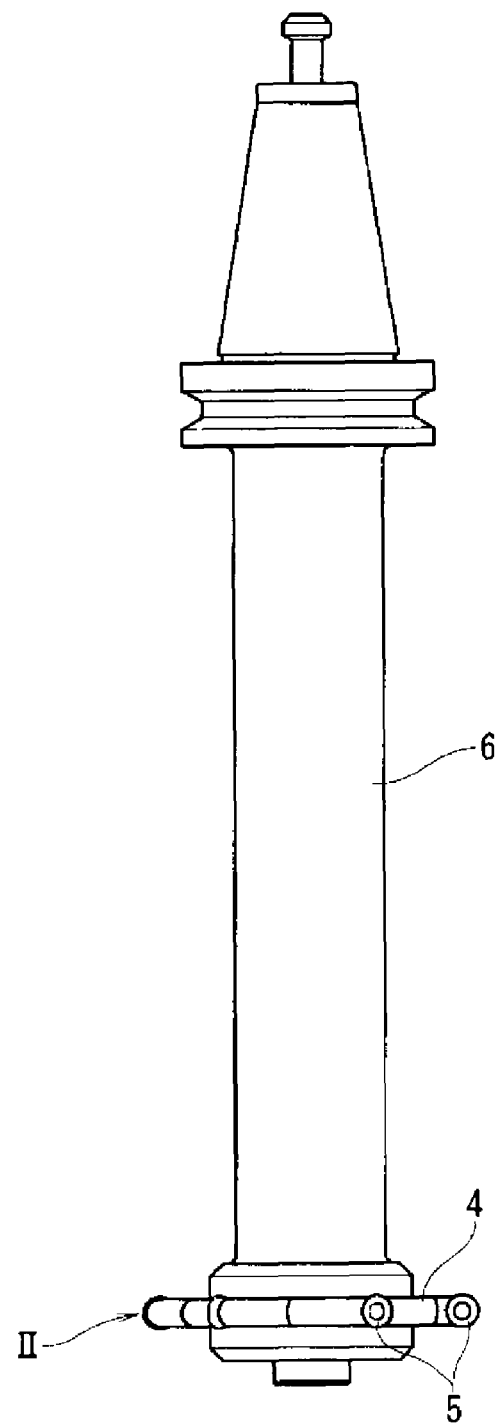
FIG. 12B A side view of the above-mentioned cutter under a state in which the cutter is mounted on an arbor.

FIGS. 12A and 12B illustrate a side cutter II including a plurality of arc-shaped cutting edges 5 circumferentially arranged at intervals around the cutter body 4. The side cutter II is used to finish the starting hole formed in the material for the elbow. The illustrated side cutter II is a cutter obtained by modifying a commercially available cutter of which the cutting edges 5 are formed by removable round inserts so that the cutter can be firmly fixed to a specially ordered arbor 6. Specifically, the side cutter II is mounted on the leading end of the arbor 6. The side cutter II has an outer diameter smaller than the diameter of the starting hole. The outer diameter of the arbor 6 is further smaller than the outer diameter of the side cutter II.

Figure 13:
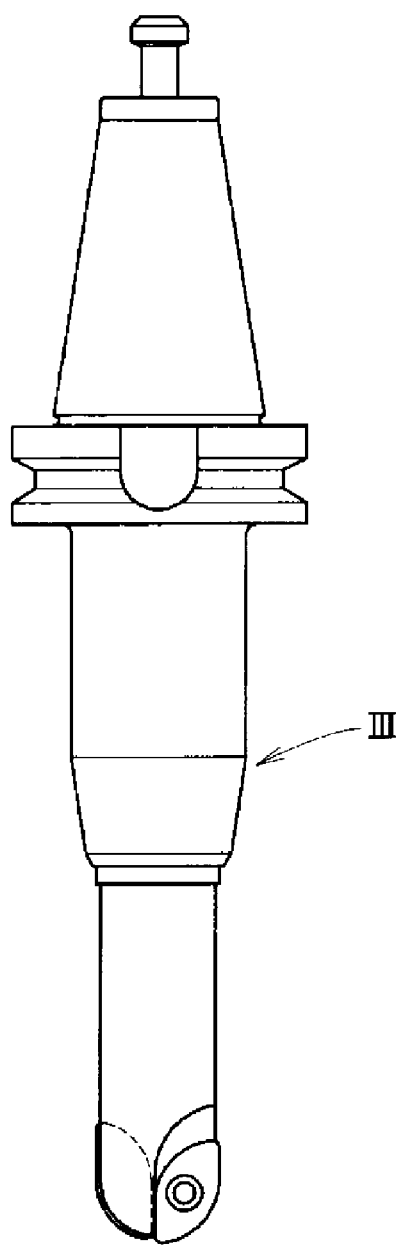
FIG. 13 A side view illustrating an example of a ball end mill for use in finishing of the outer diameter in the method according to the present invention.

FIG. 13 illustrates a commercially available indexable ball end mill III. In the method embodying the invention, this indexable ball end mill III or alternatively, a solid ball end mill is used to finish the radially outer surface of the elbow.

Figure 1A:
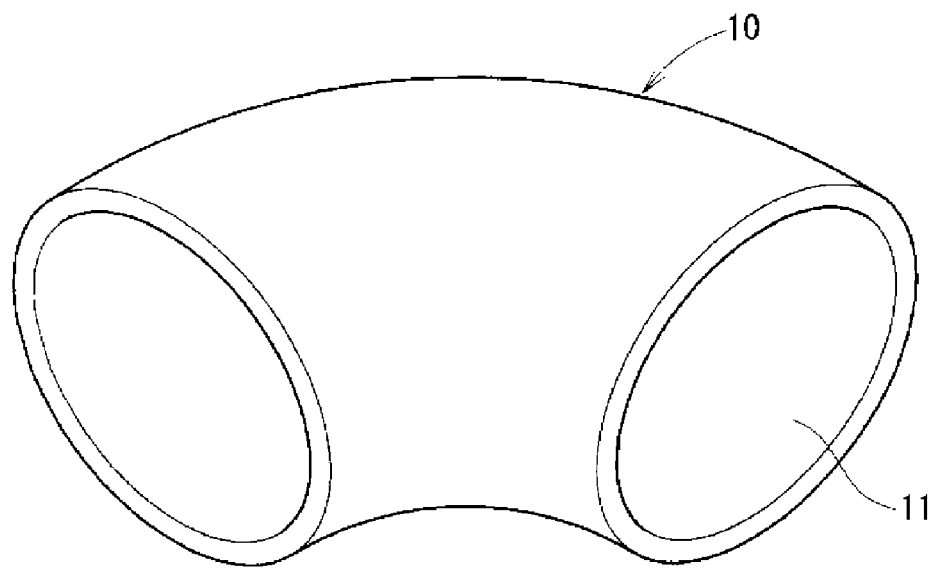
FIG. 1A A perspective view illustrating an example of a machined elbow manufactured by a method according to the present invention.
Figure 1B:
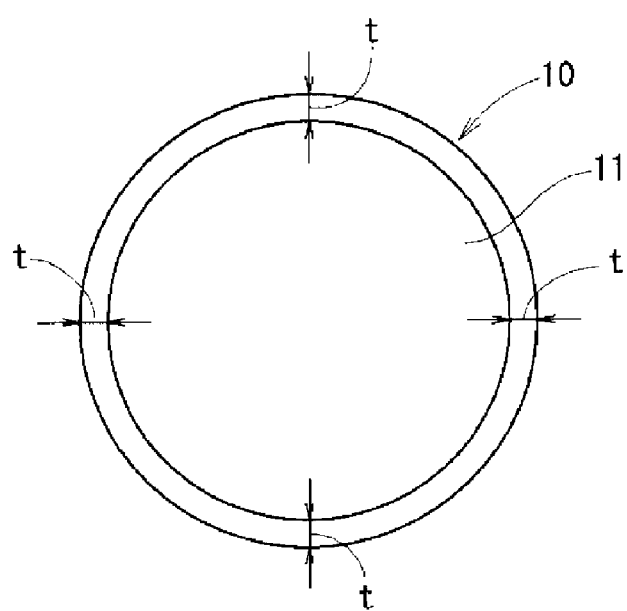
FIG. 1B A view of the elbow of FIG. 1A in a cross-section perpendicular to its axis.

An example of the machined elbow manufactured by the method according to this invention is illustrated in FIGS. 1A and 1B. The elbow 10 shown is a 90° elbow without a flange, and includes a hole 11 having a center axis bent smoothly at a predetermined curvature.

Figure 2A:
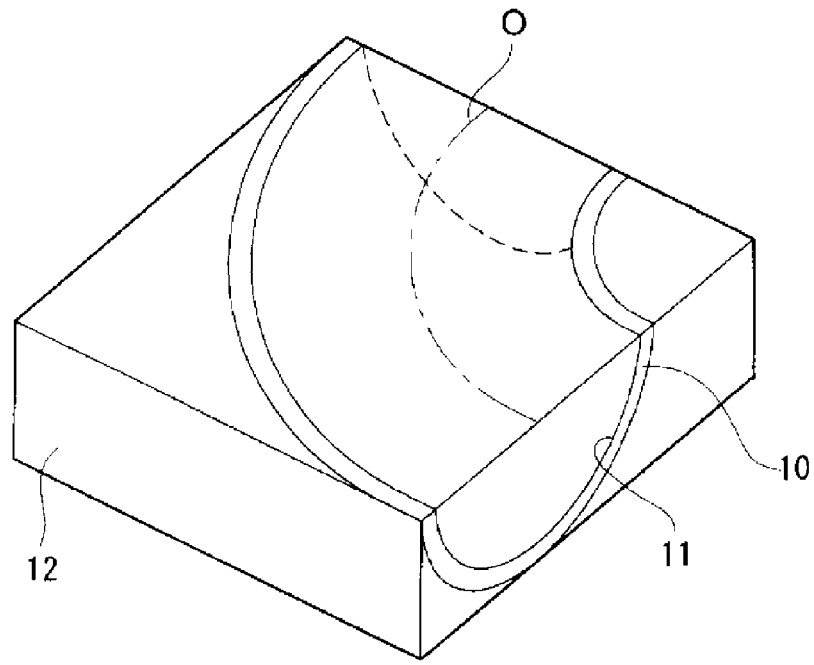
FIG. 2A A perspective view illustrating a half of an elbow machining region of a material.
Figure 2B:
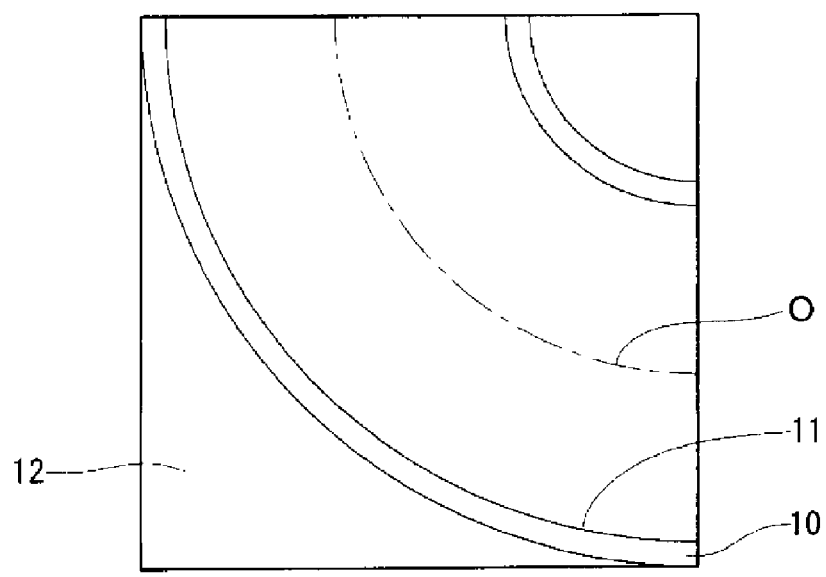
FIG. 2B A plan view of the half machining region of FIG. 2A.

Description is now given how the 90° elbow 10 of FIGS. 1A and 1B is manufactured using the above-mentioned cutting tools as an example. Reference numeral 12 of FIGS. 2A and 2B is an elbow material in the shape of a square block shape. For easy understanding of the processing situation, section views are illustrated in a manner that the material 12 is cut into half, and the cutter is illustrated in a simplified manner.

The material 12 is placed on a rotary table (not shown) of a processing machine such that the center axis O of the hole of the elbow 10 formed is on a plane parallel to the surface of the rotary table (the table surface is perpendicular to the rotation axis of the table). The cutter and the material 12 are inclined relative to each other as described later by rotating the rotary table.

Figure 3A:
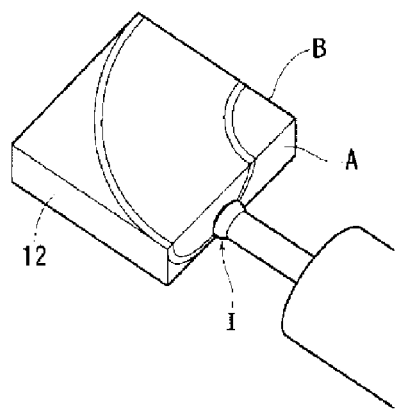
FIG. 3A A view illustrating a step of a former stage of starting hole processing.
Figure 3B:
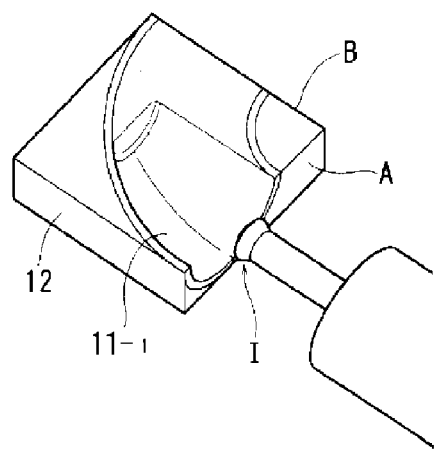
FIG. 3B A view illustrating a step of the former stage of starting hole processing.

The milling cutter I is set on the main shaft (not shown) of the processing machine, and as illustrated in FIG. 3A, the milling cutter I is fed in the axial direction so as to cut into an A surface of the material 12 while changing the cutting position and the cutting depth. In this manner, a blind hole $11_{-1}$ is formed as illustrated in FIG. 3B, which has a small undercut on the hole surface on the outer side of the bend.

Figure 3C:
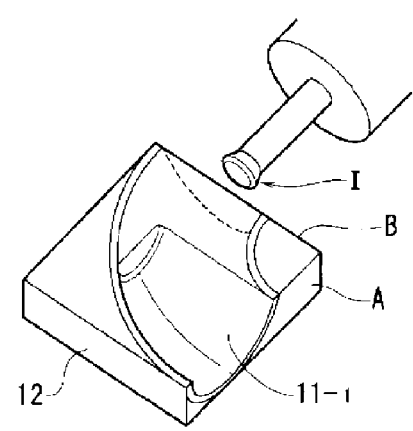
FIG. 3C A view illustrating a step of the former stage of starting hole processing.
Figure 3D:
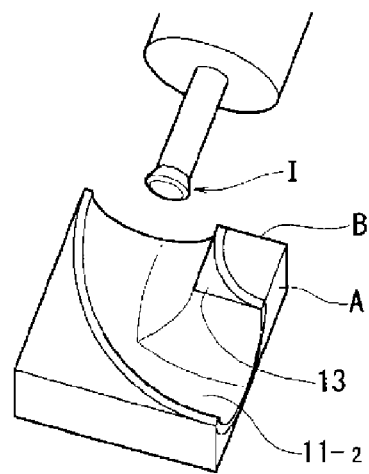
FIG. 3D A view illustrating a step of the former stage of starting hole processing.

Next, as illustrated in FIGS. 3C and 3D, the material 12 is positioned such that its B surface which is orthogonal to the A surface faces the milling cutter I. In this state, in the same manner as the hole is formed in the A surface with the milling cutter I, the milling cutter I is fed in the axial direction so as to cut into the B surface while changing the cutting position and the cutting depth until the hole thus formed communicates with the blind hole $11_{-1}$, thus forming a through hole $11_{-2}$ formed with an undercut 13 swelled in the hole diameter direction on the inner side of the bend.

Figure 4A:
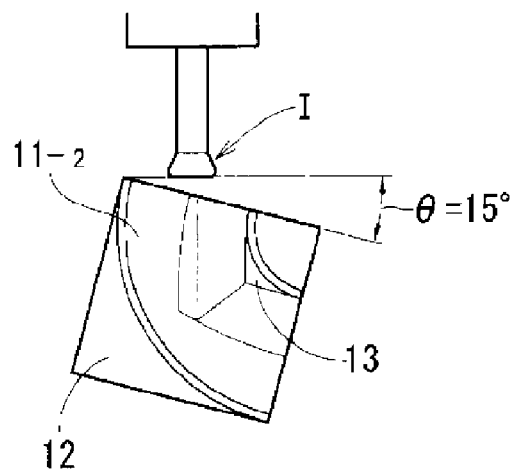
FIG. 4A A view illustrating a step of a latter stage of starting hole processing.

Thus, in this state, the undercut 13 still remains in a large amount. That is, the side cutter II of FIGS. 12A and 12B cannot completely remove the undercut by finish cutting. To reduce the undercut, with the material 12 inclined at θ° with respect to the milling cutter I such that the leading end of the cutter I is located nearer to the inner side of the bend of the elbow as illustrated in FIG. 4A, the milling cutter I is fed in the axial direction while changing the cutting position, to partially remove the undercut 13.

Figure 4B:
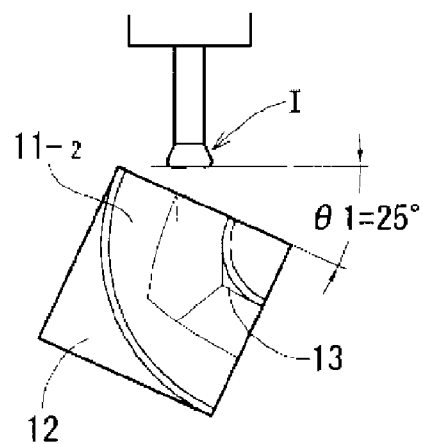
FIG. 4B A view illustrating a step of the latter stage of starting hole processing.
Figure 4C:
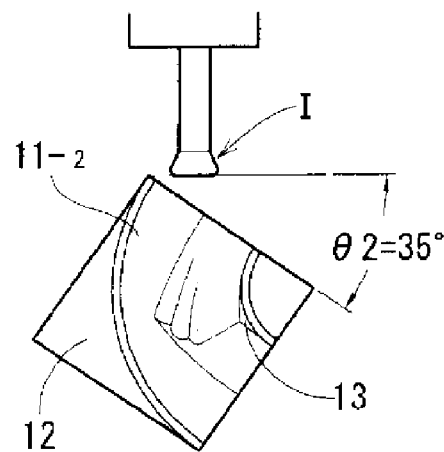
FIG. 4C A view illustrating a step of the latter stage of starting hole processing.
Figure 4D:
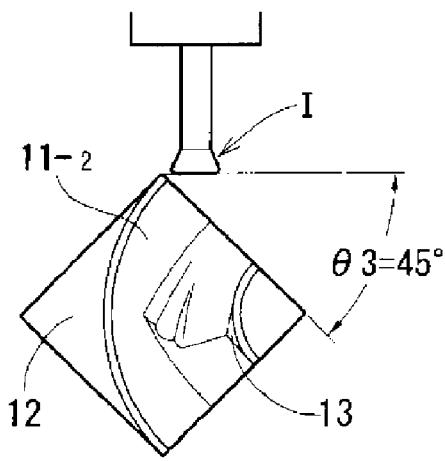
FIG. 4D A view illustrating a step of the latter stage of starting hole processing.

This operation is repeated several times while gradually increasing the relative inclination angle between the milling cutter I and the material 12, to thereby sufficiently reduce the remaining amount of the undercut 13. The relative inclination angle between the material 12 and the milling cutter I in this processing is set in accordance with the type of the material so that an excess cutting load is not imparted to the cutter. In an evaluation test, θ of FIG. 4A is set to 15°, θ1 of FIG. 4B is set to 25°, θ2 of FIG. 4C is set to 35°, and θ3 of FIG. 4D is set to 45°, but the angles are not limited thereto.

The undercut 13 may be removed by feeding the cutter from both ends of the through hole $11_{-2}$. But in many cases, the undercut 13 can be removed sufficiently by feeding the cutter from one end only of the through hole $11_{-2}$. This reduces the number of times the cutter is fed into the hole.

Figure 4E:
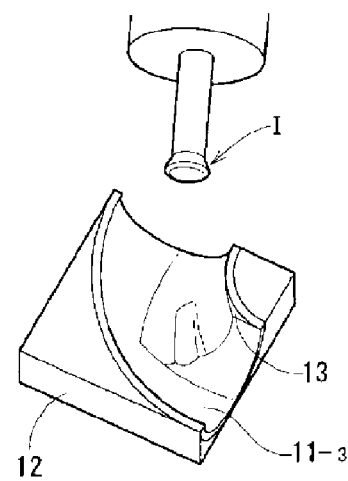
FIG. 4E A view illustrating a step of the latter stage of starting hole processing.

At the end of these steps, a starting hole $11_{-3}$ as illustrated in FIG. 4E is formed in the material 12. Then, the tool mounted on the main shaft of the processing machine is replaced with the side cutter II of FIGS. 12A and 12B, and the side cutter II is used to finish the starting the starting hole $11_{-3}$.

Figure 5A:
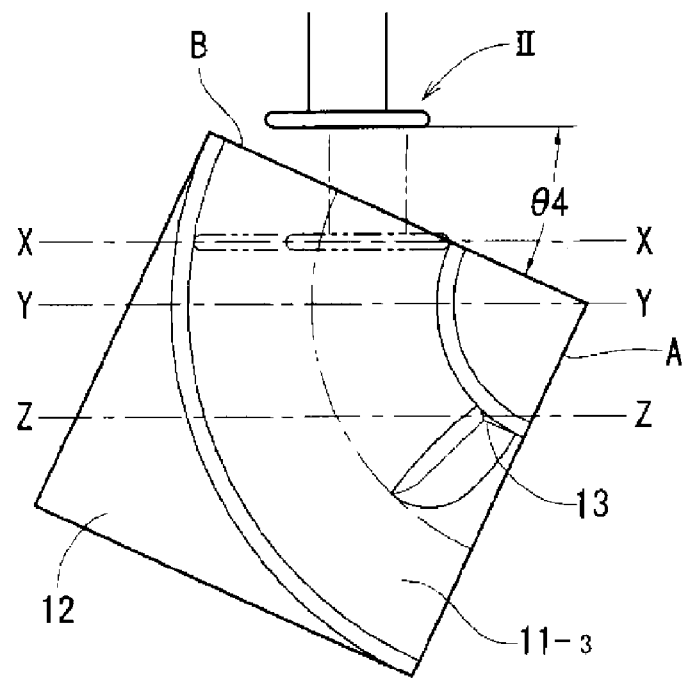
FIG. 5A A view illustrating postures of the material and a side cutter when one end side of the starting hole is finished.

The finishing is performed as follows. With the side cutter II inclined at an angle of θ4 relative to the material 12 such that the end surface of the side cutter II is more remote from the opening of the starting hole $11_{-3}$ on the inner side of the bend of the elbow 10 to be cut, as illustrated in FIG. 5A, the side cutter II is revolved while being rotated about its axis so that the side cutter II cuts into the hole surface of the starting hole $11_{-3}$. At this time, the side cutter II is revolved so that the cutter moves on a helical trajectory along a hole surface to be finished. In this case, it is conceived that the relative inclination angle θ4 between the side cutter II and the material is always constant. But this is not an essential requirement.

FIGS. 6A to 6F are views illustrating a state in which the side cutter II is revolved in the counterclockwise direction while being rotated about its axis and fed in the axial direction. Since the side cutter II is fed in the axial direction while being revolved, side cutter II moves on a helical trajectory.

The hole 11 of the elbow 10 has such a shape that it has a completely circular cross-section when taken along a line perpendicular to the center axis of the hole 11 of the elbow 10 before being finished and parallel to the end surface of the side cutter, which is perpendicular to the center axis of the side cutter II and inclined at an angle of θ4 relative to the material 12 (i.e. when taken along the line Y-Y of FIG. 5A), while all the other cross-sections parallel to the end surface of the side cutter, including the cross-sections taken along lines X-X and Z-Z of FIG. 5A are oval. Any of such oval cross-sections is different in size and shape from all the other such oval cross-sections. The side cutter II is moved while being revolved along the hole surface to be finished, which has the above-mentioned cross-sectional shapes.

In this case, the finishing at the position exceeding the line Z-Z (the other end side of the hole) is performed so that the cutter is moved along the hole cross-section only on the outer side of the bend of the hole, to thereby prevent the arbor 6 from interfering with the material. In the finishing of the starting hole from the one end, only a half of the hole is required to be processed. Therefore, the cutter does not need to be forcedly moved along the hole cross-section on the inner side of the bend.

If a large amount of material has to be removed during finish cutting, the finish cutting may be performed several times to reduce the cutting load per one time. Through adoption of a method in which the machining remainder part is gradually cut off in several times to finish the product to have a target inner diameter in the final processing, excess cutting load is not imparted, and processing stability and processing accuracy are improved.

With the processing using the side cutter subjected to movement control, the undercut remaining in the starting hole $11_{-3}$ is largely removed, and thus the inner diameter of the starting hole on the one end side is finished.

Figure 5B:
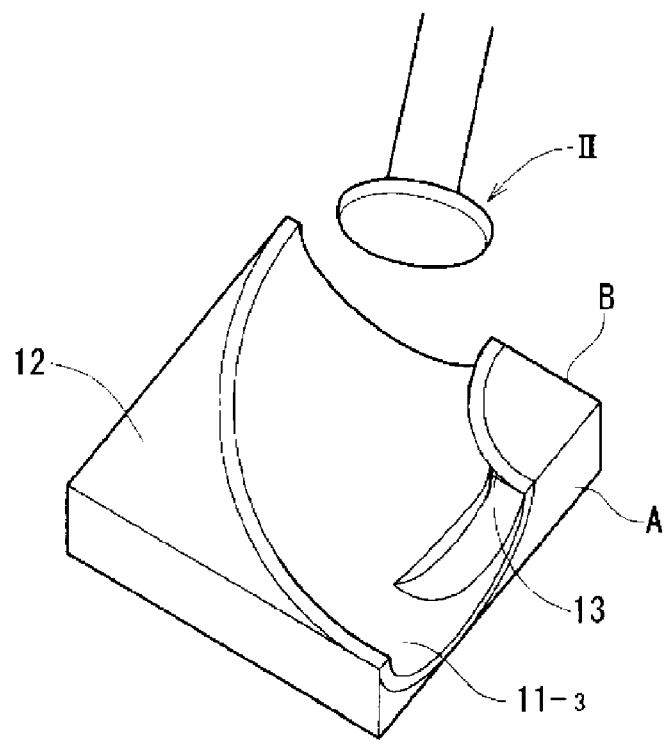
FIG. 5B A perspective view illustrating a half of the starting hole whose one end side is finished.
Figure 6A:
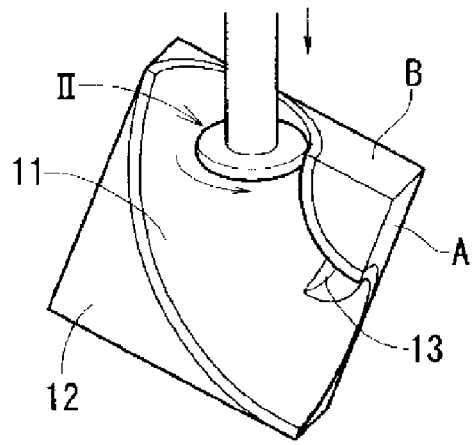
FIG. 6A A view illustrating revolution movement of the side cutter in the finishing of the one end side of the starting hole.
Figure 6B:
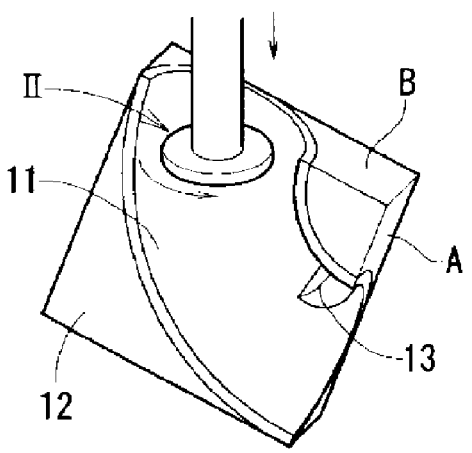
FIG. 6B A view illustrating the revolution movement of the side cutter in the finishing of the one end side of the starting hole.
Figure 6C:
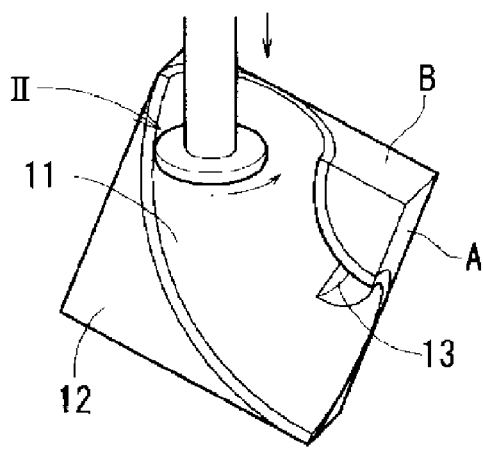
FIG. 6C A view illustrating the revolution movement of the side cutter in the finishing of the one end side of the starting hole.
Figure 6D:
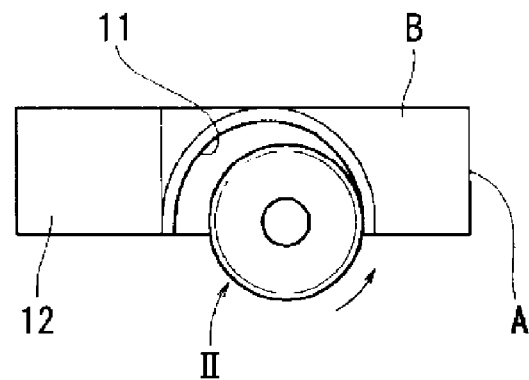
FIG. 6D A view of the revolution movement of the side cutter when viewed from above correspondingly to FIGS. 6A to 6C.
Figure 6E:
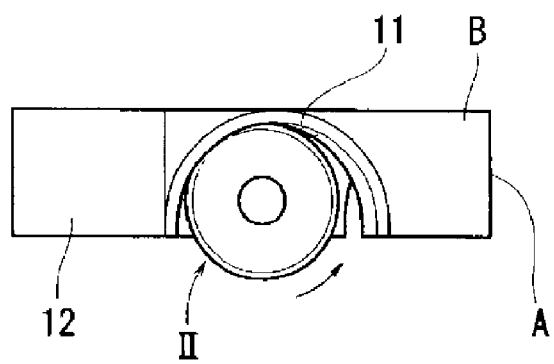
FIG. 6E A view of the revolution movement of the side cutter when viewed from above correspondingly to FIGS. 6A to 6C.
Figure 6F:
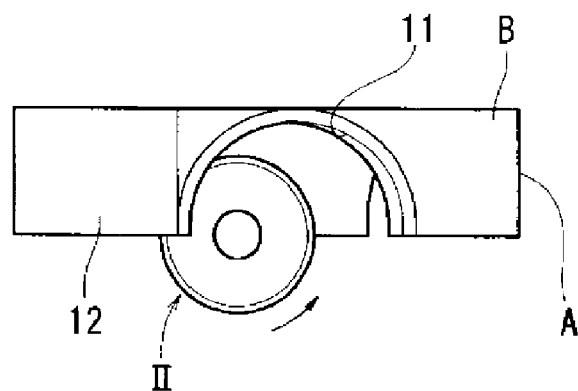
FIG. 6F A view of the revolution movement of the side cutter when viewed from above correspondingly to FIGS. 6A to 6C.
Figure 7A:
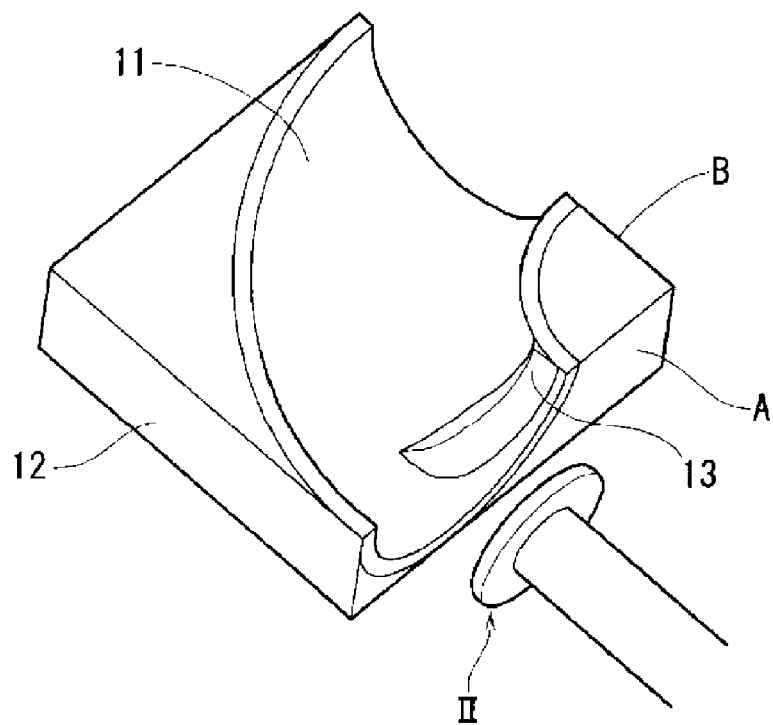
FIG. 7A A perspective view illustrating an unfinished state of the other end side of the starting hole.
Figure 7B:
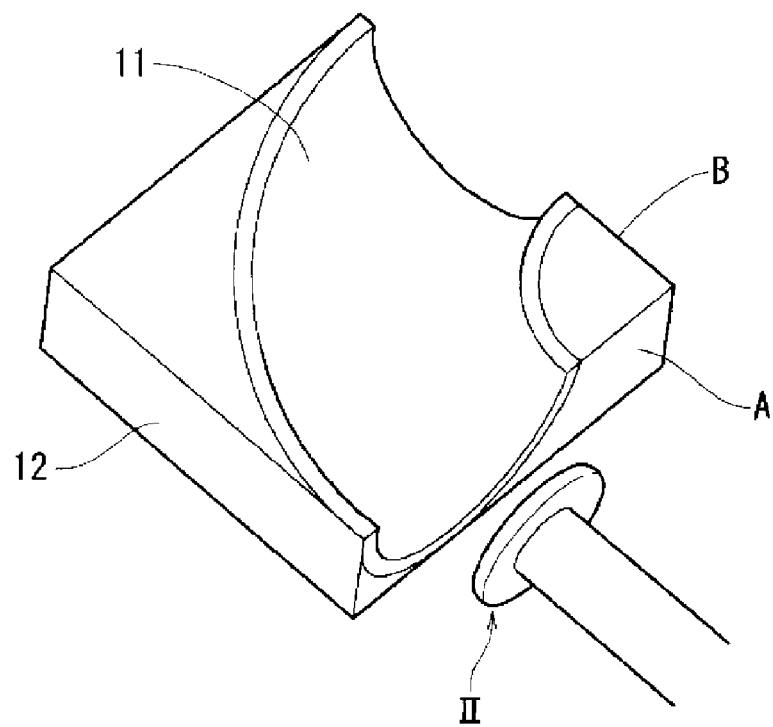
FIG. 7B A perspective view illustrating a finished state of the other end side of the starting hole.

In the processing of the starting hole from the one end, there is a processing restriction due to the hole shape, and hence it is impossible to finish the entire region of the starting hole as in FIG. 5B. Therefore, subsequently, the starting hole $11_{-3}$ is processed also from the other end to finish the hole. The side cutter II is arranged on the other end of the starting hole $11_{-3}$ as illustrated in FIG. 7A, and an operation similar to that described above is performed (the movement control in the same conditions as above is not necessary), and thus the remaining part of the undercut 13 is cut off.

In this manner, the hole 11 of the elbow has such a shape that its cross-sections taken along any plane perpendicular to the axis of the hole 11 is a true circle, with the hole surface moderately bent in parallel to its center axis.

Figure 11B:
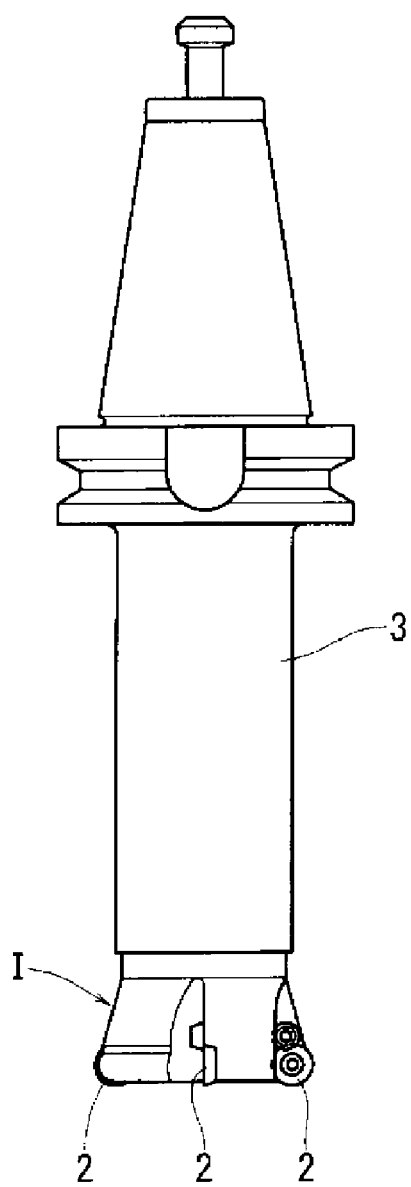
FIG. 11B A side view of the cutting tool of FIG. 11A.

After finishing the hole 11 in this manner, the radially outer surface of the elbow is subjected to rough cutting using the milling cutter I of FIGS. 11A and 11B, and then finished using the ball end mill III of FIG. 13. The desired elbow is thus completed.

The radially outer surface of the elbow is preferably finished after forming the hole because with this arrangement, the material can be held in position more stably while forming the hole and because there is no possibility of damaging the finished radially outer surface when forming the hole. But the radially outer surface may be finished before forming the hole.

The milling cutter I or the side cutter II may be inclined relative to the material 12 by inclining the main shaft of the processing machine on which the cutter is mounted.

Although the control of the processing machine becomes a little complicated, the object of the invention can be also achieved by performing the finishing step of the radially inner surface of the starting hole $11_{-3}$ on the one end as follows. The side cutter II is revolved while being rotated about its axis to cut into the starting hole $11_{-3}$, and while inclining the side cutter II and the material 12 relative to each other in accordance with the hole bent state at a position at which the hole 11 of the elbow is bent so that the movement of the side cutter II is performed in a plane substantially perpendicular to the center axis of the hole to be provided in the elbow as a finished product, the inner diameter of the starting hole $11_{-3}$ on the one end side is processed halfway from the one end toward the other end of the hole. Then, from the position at which the relative inclination angle between the side cutter II and the material 12 reaches an allowance upper limit, the relative inclination angle is fixed.

Figure 8A:
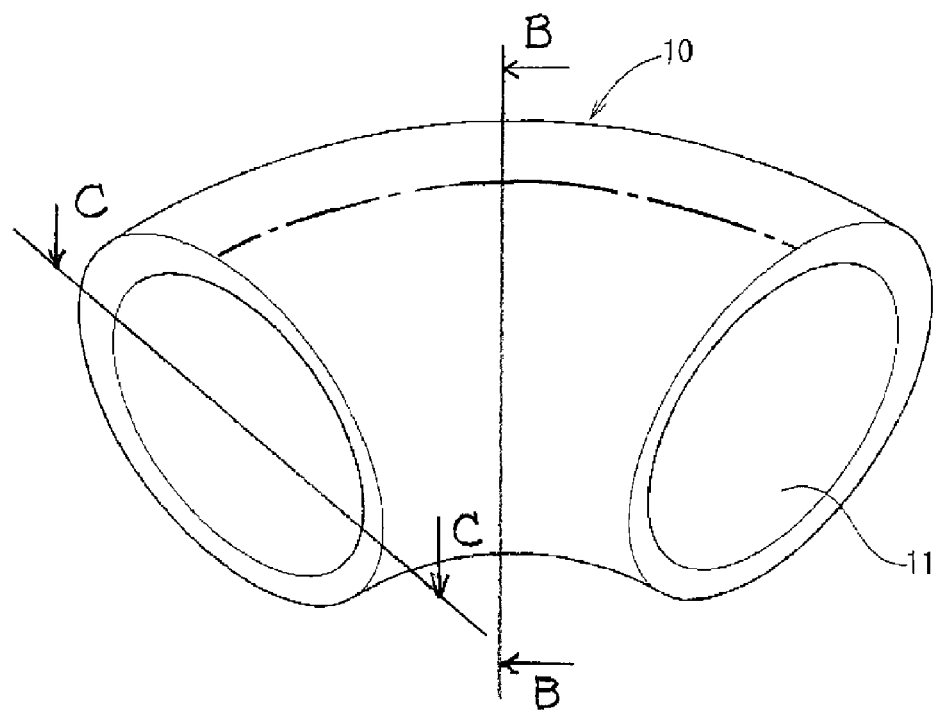
FIG. 8A A perspective view illustrating another example of the machined elbow manufactured by the method according to the invention.
Figure 8B:
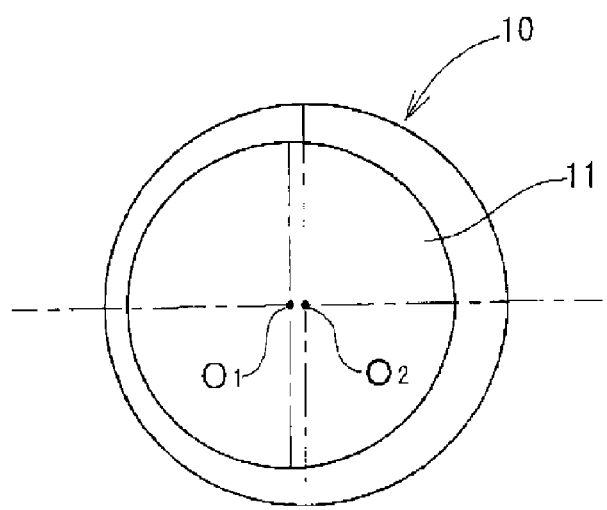
FIG. 8B A view of the elbow of FIG. 8A in a cross-section perpendicular to its axis.
Figure 8C:
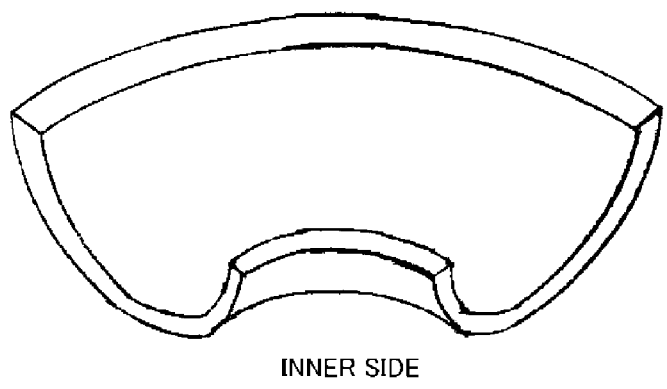
FIG. 8C A view of the elbow of FIG. 8A in a cross-section horizontal to its axis.

Since the method according to the present invention employs machining, it is possible to manufacture an elbow 10 as illustrated in FIGS. 8A to 8C, in which the center $O_1$ of the hole 11 of the elbow is eccentrically located with respect to the center $O_2$ of the radially outer surface of the elbow to increase the wall thickness and strength of the elbow on the outer side of the bend.

FIG. 8A is a perspective view of this elbow 10, FIG. 8B is a sectional view of the elbow 10 when viewed from the direction indicated by the arrow B-B in FIG. 8A, and FIG. 8C is a sectional view of a part indicated by the arrow C-C of FIG. 8A.

In such an elbow 10, as illustrated in FIG. 8B, by adjusting the eccentricity amount between the center $O_1$ of the hole 11 of the elbow and the outer diameter center $O_2$ of the elbow, the wall thickness of the elbow on the outer side can be set to a dimension corresponding to the strength to be required.

Cracks may develop in the flank of the elbow due to vibration load. Cracks tend to develop in an area indicated by the dashed-dotted line in FIG. 8A. The elbow of this embodiment can have a desired wall thickness at its flank, and hence exerts a significant effect even against vibration cracks as described above.

In FIG. 8B, the center $O_1$ of the hole 11 of the elbow is eccentrically located on the diameter of the elbow 10, but the present invention is not limited thereto, and the center $O_1$ may be eccentrically located at any point other than on the diameter of the elbow 10.

Figure 9:
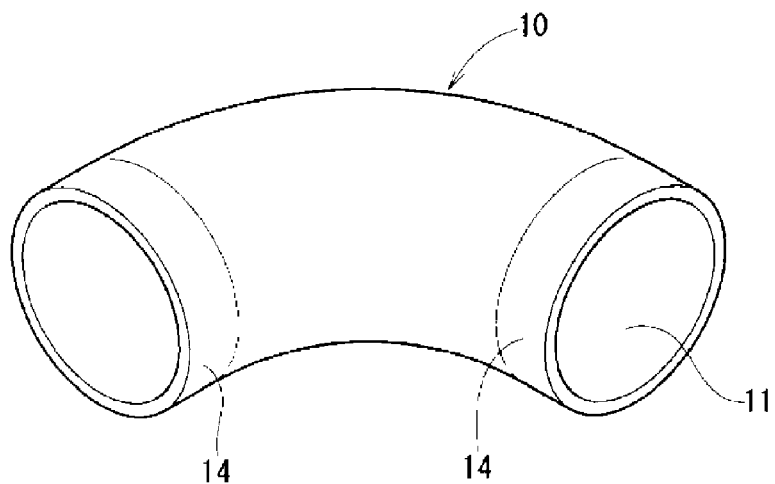
FIG. 9 A perspective view illustrating still another example of the machined elbow manufactured by the method according to the present invention.
Figure 10:
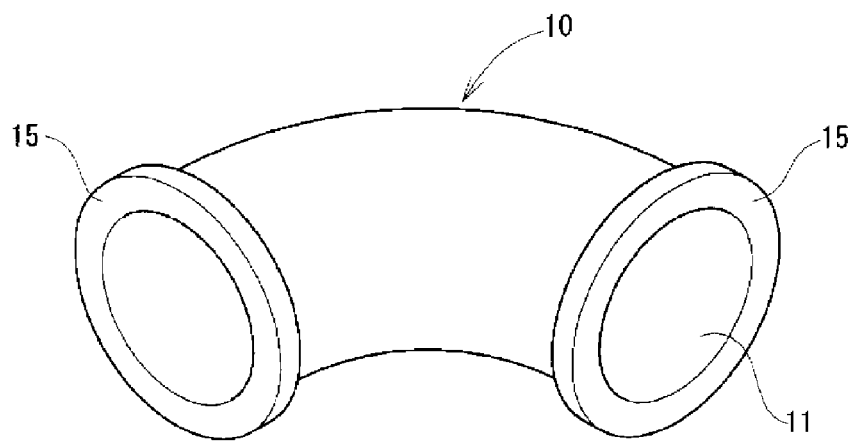
FIG. 10 A perspective view illustrating further another example of the machined elbow manufactured by the method according to the present invention.

According to this embodiment, it is possible to manufacture an elbow as illustrated in FIG. 9, which includes a straight part 14 on at least one end portion, or an elbow as illustrated in FIG. 10, in which flanges 15 for connection are integrally formed at both ends.

In this case, it is preferred that the outer side of the bend be located at a position separated by 180° from the position of the inner side of the bend, and the wall thickness be gradually increased from the inner side toward the outer side of the bend.

On the other hand, it is possible to increase or decrease the wall thickness of a desired part as necessary to any desired thickness.

In the aviation industry and the like, development of an "ultra-thin elbow" called a "duct" has been long awaited. Conventionally, a product has been formed by bending and welding an iron plate or the like. However, the thickness is as ultra-thin as 1.0 mm or less, and hence a uniform product cannot be formed due to the unevenness of the thickness during pressing. Further, the product is made of an extremely low machinability material such as titanium and Inconel, and hence studies have not been carried out.

In contrast, according to the invention, even with such materials, it is possible to process a thin elbow having an inner diameter of 2 inches to 5 inches and a wall thickness of 0.8 mm to 1.5 mm.

Also in this case, the wall thickness can be set arbitrarily as described above on the outer side and on the inner side.

Examples

A 90° elbow having an inner diameter of 190 mm, a center bend radius of φ200 mm, and a wall thickness of 10 mm was experimentally produced by the method according to the present invention. As the material for the elbow, wood was used because this was a test for verifying the processing method.

The following rotary cutting tools were used. As the milling cutter I of FIGS. 11A and 11B, there was used a round-insert mounting indexable face milling cutter having an outer diameter of 50 mm, a radius of curvature of the arc-shaped cutting edges of 8 mm, and the number of the cutting edges of 4. As the side cutter II of FIGS. 12A and 12B, there was used a round-insert mounting indexable side milling cutter having an outer diameter of 127 mm, a radius of curvature of the arc-shaped cutting edges of 6 mm, and the number of the cutting edges of 5. As the ball end mill III of FIG. 13, there was used a ball end mill having an outer diameter of 30 mm.

As the processing machine, there was used a CNC horizontal boring machine owned by the applicant. This CNC horizontal boring machine includes a world's most advanced rotary table having a divided indexing accuracy of $\frac{1}{10000}$ degrees. The material was set to this rotary table, and the material and the cutter were inclined relative to each other by a method of controlling the rotary table.

The processing was performed along the procedures described with reference to FIGS. 3A to 7B. The finishing of the starting hole by the side cutter was performed by adopting a method in which the cutting region remaining uncut was processed on a 2 mm basis to finally finish with no machining remainder. As a result, it was possible to obtain a machined elbow in which no machining remainder part was present inside the hole, the hole was a true circle and the hole surface was parallel to the center axis of the elbow, and further, the wall thickness around the tube (a wall thickness t of each part of the circumferential cross-section illustrated in FIG. 1B) was uniform.

With use of a processing machine including a rotary table having a highly-accurate indexing accuracy as described above, the high-accuracy processing can also be performed without a problem by such a method that, while inclining the side cutter and the material relative to each other in accordance with the hole bent state of the elbow so that the side cutter is halfway revolved in a plane substantially perpendicular to the center axis of the hole to be provided in the elbow as a finished product, the inner diameter of the starting hole is subjected to finishing, and then, from a position at which the relative inclination angle between the side cutter and the material reaches an allowance upper limit, the side cutter is revolved on the elliptical trajectory under a state in which the relative inclination angle is fixed.

INDUSTRIAL APPLICABILITY

According to one or more embodiments of the present invention, it is possible to manufacture, by machining, an elbow which has no unnecessary thickness inside, has a circular shape in a cross-section perpendicular to its axis in each axial part, and further, has a hole including a hole surface gently bent along an center axis. Thus, the method according to one or more embodiments of the present invention can be advantageously used as a method of manufacturing an elbow.

REFERENCE SIGNS LIST

I milling cutter, II side cutter, III ball end mill, 1, 4 cutter body, 2, 5 cutting edge, 3, 6 arbor, 10 elbow, 11 hole, $11_{-1}$ blind hole, $11_{-2}$ through hole, $11_{-3}$ starting hole, 12 material, 13 undercut, 14 straight part, 15 flange, A, B surface orthogonal to surface of material, t tube thickness.

The invention claimed is:

1. A method of manufacturing an elbow (10) by machining, comprising forming a hole (11) in a material (12) to be formed into the elbow (10), said forming of the hole (11) comprising:

forming a starting hole ($11_{-3}$) in the material (12) by rough cutting of the material (12) from two directions with a rotary cutting tool, the starting hole ($11_{-3}$) having an undercut (13) remaining at least on a hole surface on a side which corresponds to an inner side of a bend of the elbow as a finished product;

finishing a radially inner surface of the starting hole ($11_{-3}$) on one end side using a side cutter (II) including an arc-shaped cutting edge (5) at an outer periphery thereof and having an outer diameter smaller than a finished hole diameter, wherein the side cutter (II) is inclined at a predetermined angle (θ4) relative to the material (12) such that an end surface of the side cutter (II) is more remote from an opening of the starting hole ($11_{-3}$) on the inner side of the bend of the elbow to be cut, and is cut into the surface of the starting hole ($11_{-3}$), while simultaneously revolving the side cutter and rotating the side cutter about a center axis of the side cutter, such that the hole (11) has a completely circular cross section taken along a plane perpendicular a center axis of the hole (11) and perpendicular the center axis of the side cutter, and an oval cross-section taken along any plane not perpendicular to the center axis of the hole (11) and perpendicular to the center axis of the side cutter, whereby the side cutter moves along the surface of the hole (11), and finishing the radially inner surface of the starting hole ($11_{-3}$) on another end side by inserting the side cutter (II) into the starting hole ($11_{-3}$) from the another end side of the starting hole, and revolving the side cutter (II) along the hole surface to be finished while rotating the side cutter (II).

2. The method of manufacturing a machined elbow according to claim 1, wherein the finishing the inner diameter of the starting hole ($11_{-3}$) on the one end side comprises:

revolving the side cutter (II) while rotating the side cutter (II) to cause the side cutter (II) to cut into the starting hole ($11_{-3}$), to thereby process halfway the inner diameter of the hole of the elbow on the one end side from the opening side of the hole while inclining the side cutter (II) and the material (12) relative to each other in accordance with a hole bent state at a position at which the hole of the elbow is bent so that the side cutter (II) moves in a plane substantially perpendicular to an center axis of the hole to be provided in the elbow as the finished product; and fixing a relative inclination angle from a position at which the relative inclination angle between the side cutter (II) and the material (12) reaches an allowance upper limit.

3. The method of manufacturing a machined elbow according to claim 1, wherein processing of the starting hole ($11_{-3}$) is carried out using a milling cutter (I) including an arc-shaped cutting edge (2) at a leading end outer periphery thereof and having an outer diameter smaller than an inner diameter of the starting hole, the processing of the starting hole ($11_{-3}$) being carried out through the steps of:

forming a through hole ($11_{-2}$) by causing the milling cutter (I) to cut into each of adjacent two surfaces (A, B) of the material (12) while changing a cutting position and a cutting depth, the through hole ($11_{-2}$) having the undercut (13) intersecting at an angle equal or nearly equal to a bent angle of the elbow on the inner side of the bend of the elbow, the through hole ($11_{-2}$) being shaped substantially along the hole surface of the hole (11) of the elbow on an outer side of the bend of the elbow; and reducing a remaining amount of the undercut (13) by inclining the milling cutter (I) in a direction in which a leading end of the milling cutter (I) comes near the inner side of the bend of the elbow to cut off the undercut (13), the cutting off the undercut (13) being repeated several times while changing an inclination angle of the milling cutter (I).

4. The method of manufacturing a machined elbow according to claim 1, wherein the material (12) is inclined relative to a milling cutter (I) and the side cutter (II) in a necessary direction by setting the material (12) on a rotary table having a rotation indexing function under a state in which a center of the hole of the elbow to be machined is placed on a plane parallel to a table surface of the rotary table, and rotating the rotary table.

5. The method of manufacturing a machined elbow according to claim 1, wherein the material (12) comprises a low machinability metal material.

6. The method of manufacturing a machined elbow according to claim 1, wherein the hole (11) of the elbow is eccentrically located with respect to an outer diameter of the elbow in a direction in which a wall thickness of the elbow increases on an outer side of the bend of the elbow.

* * * * *